United States Patent [19]

Schmitt

[11] 4,022,731

[45] May 10, 1977

[54] FREEZE-THAW STABLE, SELF-INVERTING, WATER-IN-OIL EMULSION

[75] Inventor: Joseph Michael Schmitt, Ridgefield, Conn.

[73] Assignee: American Cyanamid Company, Stamford, Conn.

[22] Filed: Oct. 24, 1975

[21] Appl. No.: 625,604

[52] U.S. Cl. .................... 260/29.6 E; 260/29.6 Z; 260/29.6 HN; 260/29.6 MH; 260/29.6 WQ; 260/29.6 H
[51] Int. Cl.$^2$ ........................................ C08L 33/26
[58] Field of Search ............. 260/29.6 HN, 29.6 Z, 260/29.6 E, 29.6 MH, 29.6 WQ, 29.6 H

[56] References Cited

UNITED STATES PATENTS

| | | | |
|---|---|---|---|
| 3,284,393 | 11/1966 | Vanderhoff et al. | 260/29.6 HN |
| 3,624,019 | 11/1971 | Anderson et al. | 260/29.6 HN |
| 3,852,234 | 12/1974 | Venema | 260/29.6 H |
| R28,576 | 10/1975 | Anderson et al. | 260/29.6 HN |

*Primary Examiner*—M. J. Welsh
*Attorney, Agent, or Firm*—Frank M. Van Riet

[57] ABSTRACT

A freeze-thaw stable, self-inverting, water-in-oil emulsion comprising an aqueous phase of a polymer of acrylamide, a hydrocarbon oil, a water-in-oil emulsifying agent and an inverting surfactant mixture comprising sodium bis(2-ethylhexyl)sulfosuccinate and a sodium bis($C_{11}$–$C_{15}$ alkyl)sulfosuccinate or an ethoxylated octyl or nonyl phenol and a method for the preparation thereof.

16 Claims, No Drawings

FREEZE-THAW STABLE, SELF-INVERTING, WATER-IN-OIL EMULSION

BACKGROUND OF THE INVENTION

Emulsions of polyacrylamide, and copolymers of acrylamide with other copolymerizable monomers, which are effective flocculants for many substrates including sewage, cellulose fibers and fines for retention and freeness, metal ore treatment, plating waste, coal trailings, steel mill flue ducts and sinter fines, and potable water have become increasingly important in recent years. These emulsions are usually of the water-in-oil variety and are inverted, by the addition of water thereto, to oil-in-water emulsions during which the polymer is rapidly dissolved in the water. Emulsions and dissolution procedures of this type are disclosed in U.S. Pat. Nos. Re. 28,474, 3,826,771, and 3,284,393, which patents are hereby incorporated herein by reference.

While these emulsions are very effective when used as fluocculants, they tend to be materially reduced in their effectiveness when they are subjected to alternating freezing and thawing temperature such as would exist in many areas during the winter season. The repeated temperature cycles tend to cause the emulsions to coagulate, i.e., form into large clumps of polymer rather than remain finely dispersed particles and, as a result, their usefulness as flocculating agents is drastically reduced.

SUMMARY OF THE INVENTION

The novel emulsions of the present invention exhibit excellent freeze-thaw properties, that is, they do not form into clumps to the extent that they are rendered useless as flocculants when subjected to freeze-thaw conditions. Furthermore, they retain all the other attractive properties exhibited by existing emulsions such as high temperature stability, full inversion upon dilution with water, good tolerance to hard water and good dispersion of oil in water after inversion (i.e., no separation or creaming of the oil phase).

This combination of excellent properties is achieved by the use of a critical inverting surfactant mixture.

DESCRIPTION OF THE INVENTION INCLUDING PREFERRED EMBODIMENTS

The present invention comprises a freeze-thaw stable, self-inverting, non-creaming, water-in-oil emulsion containing a dispersion therein of finely-divided polymer particles, said emulsion comprising:

A. an aqueous phase ranging from about 70% to about 95%, by weight, based on the total weight of A and B which is comprised of
1. a water-soluble acrylamide polymer containing from about 0.0% to about 35.0% of an acrylic acid or (methacrylamidopropyl)trimethylammonium chloride comonomer, wherein said acrylic acid is from about 50% to about 100% neutralized, and having a concentration of from about 27% to about 68%, by weight, based on the total weight of (A), and
2. water, in an amount ranging from about 32% to about 73%, by weight, based on the total weight of (A), B. a liquid hydrocarbon oil in an amount ranging from about 5% to about 30%, by weight, based on the total weight of A and B, C. a water-in-oil emulsifying agent dispersed between said aqueous phase and said liquid hydrocarbon at a concentration ranging from about 0.1% to about 15.0%, by weight, based on the total weight of A, B and C, and D. an inverting surfactant mixture comprising
1. sodium bis(2-ethylhexyl)sulfosuccinate and
2. a sodium bis($C_{11}$–$C_{15}$ alkyl)sulfosuccinate or an ethoxylated octyl or nonyl phenol.

As can be seen, the aqueous phase of my novel emulsions is comprised of an acrylamide polymer and water. The polymer may comprise polyacrylamide or a copolymer of acrylamide containing 65–98% of acrylamide and 2–35% of an acrylic acid or (methacrylamidopropyl)trimethylammonium chloride. If an acrylic acid is used, it must be from about 50% to about 100% neutralized to impart the freeze-thaw stability mentioned above to the final composition, the higher degree of neutralization being used when the acrylic acid content is below about 15%. Neutralization of the acrylic acid is preferably effected before the monomers are copolymerized; however, it can be conducted after copolymerization, if desired. Neutralization is effected by contacting the acrylic acid monomer in aqueous solution with an appropriate amount of any known neutralization agent such as the alkali and alkaline earth metal hydroxides, ammonium hydroxide, amines and the like, as is known in the art. The pH of the resultant aqueous phase will then range from about 4.5 to about 5.5.

In the preferred sequence, the acrylamide, alone or with the comonomer, is dissolved in water to attain the desired solids concentration and a suitable chelating agent such as ethylenediaminetetraacetic acid disodium salt is added to chelate metal ions which may be present in the system such as that which may have been incorporated into the acrylamide during its production. The neutralization of the acrylic acid, if present, follows, a small amount of iron preferably being added as a component of the initiator system, as more fully discussed hereinbelow. The oxidant part of the redox (as discussed below) catalyst system is preferably added to the aqueous phase at this time, or later as described below.

After the aqueous phase has been formed as above, it is homogenized into the oil phase which, at this time, constitutes a solution of the oil and a water-in-oil emulsifier. Any known oil may be used for this purpose such as those set forth in the above incorporated U.S. patents. A preferred oil useful for this purpose is a commercially available product sold under the trademark AMSCO OMS by the Union Oil Co. of California. It is a clear, oily liquid comprising approximately 86.9% paraffins, 13.0% naphthenes and 0.1% aromatics. It has a molecular weight of about 170, a Specific Gravity of 0.755 at 60° F., a Viscosity of 1.4 cps. at 77° F., a Freezing Point below −25° F., a Boiling Point of 399° F., a Flash Point TCC of 126° F. and is insoluble in water. Its Specific Heat is 0.499BTU/16.° F. at 100° F. and 0.588 BTU/16.° F. at 200° F.

Any available water-in-oil emulsifier may be employed, those set forth in the above U.S. Patents being exemplary. A preferred emulsifier is sorbitan monooleate.

After the water-in-oil emulsion is formed by agitation of the oil and water phases to insure uniform blending, the oxidant part of the redox catalyst system may be added, if it had not been added previously as described above. This ingredient is added as an aqueous solution of the monomer emulsion in its complete concentration, i.e., from about 10 parts to about 500 parts per million parts of monomers, preferably 25–150 ppm. Any redox catalyst system can be used herein such as the bromate-sulfite systems; the peroxide-sulfite systems; the hydroperoxide-bisulfite systems, etc. Additionally, other free-radical catalyst systems may be employed, e.g., azobisisobutyronitrile, benzoyl peroxide, lauroyl peroxide; potassium persulfate and the like as is known in the art. When the single component catalyst systems are employed, they are not added to the monomer emulsion until conversion of the monomers to polymer is desired. In the preferred aspect of this invention, however, the oxidant portion of a redox catalyst system comprisng t-butyl hydroperoxide and sodium metabisulfite, is added to the monomer emulsion first. The catalyst system preferably also utilizes from about 1 ppm to about 10 ppm of iron, based on monomers, as a component thereof, which iron can be extraneously added to the aqueous phase as mentioned above or can be present as an inherent ingredient in the water or monomers per se. The reducing portion of the redox catalyst should be employed in amounts ranging from about 10 ppm to about 500 ppm based on monomers, preferably 50–200 ppm.

After the reaction mixture is prepared in the above manner, the system is then sparged with nitrogen gas to remove all oxygen from the system and the reducing portion of the catalyst system is then pumped into the monomer emulsion containing the oxidant portion of the catalyst over a period of from about 2 to about 24 hours, i.e., until substantially complete conversion is accomplished, preferably about 4–16 hours, the longer times being necessitated by the lower concentration of catalyst and vice versa. The temperature of the reaction media should be maintained at from about 25° C. to about 55° C., preferably 35° C.–45° C.

After the catalyst component has been added and polymerization is substantially complete, stabilization of the resultant polymer is effected by the addition of a further quantity of sodium metabisulfite, i.e., the reducing portion of the catalyst at polymerization temperature to stabilize the polymer.

The novel, so-called one-package, emulsion of the present invention, so called because inversion thereof can be accomplished by the addition of water only, is then produced by adding the above-described inverting surfactant mixture thereto.

The amount of the sodium bis(2-ethylhexyl)sulfosuccinate component of the inverting surfactant mixture employed depends upon whether the polymer in the aqueous phase is cationic, anionic or non-ionic. If the polymer is cationic, the sodium bis(2-ethylhexyl)sulfosuccinate is employed in amounts ranging from about 0.25% to about 1.5%, preferably about 0.35% to about 0.75%, by weight, based on the total weight of the emulsion, i.e., components A, B, C and D, above. When the homopolymer or copolymer in the aqueous phase is anionic or non-ionic, the amount of sodium bis(2-ethylhexyl)sulfosuccinate should range from about 2.8% to about 7.0%, preferably about 3.0% to about 4.5%, by weight, same basis. The sodium bis(2-ethylhexyl)sulfosuccinate may be used per se or as a solution in an oil. Suitable oils include those set forth in the above patents and the above disclosure, the concentration in the oil ranging from about 25% to about 50%.

As mentioned above, the second component of the inverting surfactant mixture comprises either a sodium bis($C_{11}$–$C_{15}$ alkyl)sulfosuccinate or an ethoxylated octyl or nonyl phenol. Examples of suitable sodium bis($C_{11}$–$C_{15}$ alkyl)sulfosuccinates include sodium bis(undecyl)sulfosuccinate, sodium bis(tridecyl)sulfosuccinate, sodium bis(pentadecyl)sulfosuccinate and the like. This component is incorporated into the emulsion in an amount ranging from about 0.2% to about 0.6%, preferably from about 0.3% to about 0.5%, by weight, based on the total weight of the emulsion, i.e. components A, B, C and D above.

The ethoxylated octyl or nonyl phenols useful as the second component in the inverting surfactant mixture comprises the reaction product of about one mole of octyl or nonyl phenol with from about 5–10 moles, preferably about 6–8 moles, of ethylene oxide. These materials are well known in the art as represented by the above set forth U.S. patents. The ethoxylated octyl and nonyl phenols are employed in amounts ranging from about 1.5% to about 2.5%, by weight, preferably about 2.0%, by weight, again based on the total weight of the emulsion, i.e., components A, B, C and D above.

The following examples are set forth for purposes of illustration only and are not to be construed as limitations on the present invention except as set forth in the appended claims. All parts and percentages are by weight unless otherwise specified.

EXAMPLE 1

To a suitable reaction vessel are added 2100.0 parts of acrylamide, as a 50.47% aqueous solution, and 850.0 parts of deionized water. To this solution is added 2.12 parts of the disodium salt of ethylenediamine tetraacetic acid and 1.15 parts of hydrated ferric sulfate (72% $Fe_2(SO_4)_3$) used as 4.5 parts/1000 parts $H_2O$). The pH of the resultant solution is adjusted to 5.0. This constitutes the aqueous monomer phase.

The oil phase is prepared by dissolving 90.0 parts of sorbitan monooleate in 1040.0 parts of AMSCO OMS, a commercially available, clear oily liquid sold by Union Oil Co. of California.

To a suitable, high speed homogenizer is added the complete oil phase system. The homogenizer is started and the monomer aqueous phase is slowly added thereto to form an emulsion having a viscosity of 990 cps. The dispersed phase of the resultant emulsion has a particle size of about 2.5 microns or less.

To a suitable reaction vessel is added the complete emulsion system with stirring. 70.0 Parts per million (based on monomer) of t-butyl hydroperoxide are added. The resultant media is purged with nitrogen gas to remove oxygen from the system. Stirring continues, and sodium metabisulfite is slowly pumped into the vessel over a period of 6 hours while maintaining the vessel at about 40° C. after which about 100 parts per million (based on monomer) have been added. The resultant viscous emulsion exhibits 99.49% conversion of acrylamide. The polymer solids are 25.54% and the Standard Viscosity is 5.04 cps. The pH is 7.4.

Stabilization of the polymer emulsion is accomplished by adding 78.28 parts of a 30% aqueous sodium metabisulfite solution. The emulsion is maintained under polymerizing conditions (60 minutes at 40° C.) to substantially completely react the remaining acrylamide. 0.4% of the emulsion comprises bisulfite which effects stabilization of the polymer system.

To the resultant polymer emulsion are added, as an inverting agent mixture over a period of 30 minutes 5.5% of a 70% solution of sodium bis(2-ethylhexyl)sulfosuccinate in AMSCO OMS and 2.0% of the reaction product of 1 mole of octyl phenol and 7.5 moles of ethylene oxide. The resultant emulsion is held at 40° C. for an additional hour after which time the product is smooth and particle free. The dispersed polymer phase has a particle size of 2.5 microns or less. The Standard Viscosity is 5.15 cps. The final polymer solids content is 23.70%.

25.0 Parts of the final emulsion are placed in a suitable vessel and subjected to a temperature of −10° C. for 22 hours. The cold vessel is allowed to warm to room temperature over 2 hours and a count is made of the macroscopic coagulated particles therein by pouring the emulsion slowly into a second vessel and counting the particles as they pass from one vessel to the other. After the count is established, the entire emulsion is returned to the first vessel and held again at −10° C. for 22 hours. The cycle is continued for 17 days. The results are set forth in Table I below. Weekly cycles were frozen and thawed at weekly intervals at 0° C.–10° C. These results are also set forth in Table I.

TABLE I

| | Daily Emulsion of Example I | Weekly Emulsion of Example I Particle Count | | |
|---|---|---|---|---|
| Cycles | Particle Count | 0° C. | −10° C. | −20° C. |
| Initial Count* | 2 | 1 | 2 | 4 |
| 1 | 5 | 16 | 8 | 4 |
| 2 | 8 | 8 | 3 | 4 |
| 3 | 25 | 22 | 30 | 15 |
| 4 | 24 | 12 | 20 | 13 |
| 5 | 26 | 19 | 27 | 34 |
| 6 | 31 | 26 | 32 | 45** |
| 7 | 25 | 22 | 29 | — |
| 8 | 35 | 47** | 42** | |
| 9 | 30 | | | |
| 10 | 30 | | | |
| 11 | 31 | | | |
| 12 | 35 | | | |
| 13 | 39 | | | |
| 14 | 38 | | | |
| 15 | 36 | | | |
| 16 | 39 | | | |
| 17 | 43** | | | |

*Particle counts per 25 g. of emulsion
**40 or more particles constitutes insipient failure. The emulsion can be inverted but the rate of dissolution of the copolymer into solution is materially decreased.

A second portion of the emulsion of Example 1 is subjected to high temperature to determine its stability toward loss of molecular weight as measured by Standard Viscosity. The 50° C. and 60° C. results are set forth in TABLE II below. Failure is determined to be a loss of about 20% of the initial Standard Viscosity set forth above.

TABLE II

| EMULSION OF EXAMPLE 1 | | |
|---|---|---|
| Week No. | 50° C. | 60° C. |
| 1 | — | 5.05 |
| 2 | — | 4.81 |
| 3 | — | 4.55 |
| 4 | — | 4.41 |
| 5 | — | 4.03 |
| 6 | 4.93 | |
| 7 | 4.70 | |
| 8 | 4.46 | |
| 9 | 4.40 | |
| 10 | 4.16 | |

Inversion of a third portion of the emulsion of Example I is effected by injecting the portion into rapidly agitated water and continuing the agitation for 10 minutes. Inversion is substantially complete within about 30 minutes.

The third sample above exhibits no separation (creaming) after standing at room temperature for 72 hours indicating excellent dispersion of the oil in the water phase. Creaming is defined as a separation of the dispersed oil particles towards the upper portion of the contents of the container. Omission of the ethylene oxide reaction product results in a dense cream formation after standing 4–5 hours. Any creaming which occurs regarding the third sample is readily redispersible with very mild agitation. Even severe agitation of the comparative sample without the ethylene oxide reaction product therein does not cause satisfactory redispersion of the cream.

EXAMPLES 2 and 3

The procedure of Example I is again followed except that the ethylene oxide reaction product is produced from (2) one mole of octylphenol and 9.5 moles of ethylene oxide and (3) one mole of octylphenol and 5 moles of ethylene oxide. The results are set forth in TABLE III below. The initial viscosity of the product of Example II is 5.16 cps and that of Example III is 4.43 cps.

TABLE III

| | Daily Emulsion of Ex. 2 | Emulsion of Ex. 3 | Weekly Emulsion of Ex. 2 | | | Emulsion of Ex. 3 | | | Weekly Thermal Stability Emulsion of Ex. 2 | | Emulsion of Ex. 3 | |
|---|---|---|---|---|---|---|---|---|---|---|---|---|
| Cycles | | | 0° C | −10° C. | −20° C | 0° C | −10° C | −20° C | 50° C | 60° C | 50° C | 60° C |
| Initial Count | 3 | 9 | 6 | 1 | 5 | 8 | 11 | 7 | | | | |
| 1 | 4 | 12 | 9 | 18 | 6 | 10 | 15 | 10 | — | 4.93 | — | 4.65 |
| 2 | 12 | 11 | 10 | 17 | 13 | 5 | 12 | 6 | — | 4.76 | — | 4.34 |
| 3 | 29 | 14 | 28 | 58 | 17 | 22 | 28 | 18 | — | 4.36 | — | 3.95 |
| 4 | 32 | 15 | 8 | 32 | 58 | 14 | 19 | 38 | — | 4.11 | — | 3.94 |
| 5 | 31 | 18 | 12 | 42 | — | 18 | 17 | 48 | 4.94 | — | 4.90 | — |
| 6 | 29 | 27 | 18 | — | — | 15 | 28 | — | 4.67 | — | 4.71 | |
| 7 | 28 | 20 | | | | | | | | | | |
| 8 | 28 | 21 | | | | | | | | | | |
| 9 | 33 | 24 | | | | | | | | | | |
| 10 | 28 | 28 | | | | | | | | | | |
| 11 | 30 | 36 | | | | | | | | | | |
| 12 | 34 | 25 | | | | | | | | | | |
| 13 | 41 | 36 | | | | | | | | | | |
| 14 | — | 33 | | | | | | | | | | |
| 15 | — | 33 | | | | | | | | | | |
| 16 | — | 41 | | | | | | | | | | |

EXAMPLE 4

The procedure of Example 1 is repeated except that acrylic acid is added as a comonomer in an amount such that the total parts of monomer is equal but the monomer composition is 97/3 mole ratio of acrylamide to acrylic acid and the acrylic acid is 100% neutralized. The initial viscosity is 4.97 cps. The results are set forth in TABLE IV.

TABLE IV

| Freeze Thaw Cycles | Daily | Weekly 0° C | −10° C | −20° C | Weekly Thermal Stability 50° C | 60° C |
|---|---|---|---|---|---|---|
| Initial | 5 | 3 | 9 | 2 | — | |
| 1 | 22 | 5 | 7 | 2 | — | 5.03 |
| 2 | 23 | 6 | 9 | 4 | — | 3.40 |
| 3 | 21 | 17 | 27 | 10 | 5.25 | |
| 4 | 25 | 19 | 50 | 22 | 5.01 | |
| 5 | 28 | 21 | — | 33 | 3.20 | |
| 6 | 42 | | | | | |

EXAMPLE 5

The procedure of Example 1 is again followed except that the ethylene oxide reaction product is replaced by the reaction product of one mole of nonylphenol with six moles of ethylene oxide. The Daily freeze-thaw cycle (−10° C) particle count is 3(initial), 23, 37, 45, 32, 33, 36, 29, 29, 49.

The Weekly freeze-thaw cycle (0° C) particle count (3 initial) is 26 after eight weekly cycles; at −10° C (1 initial) is 34 after 7 weekly cycles; at −20° C (1 initial) is 41 after 4 weekly cycles. The Weekly Thermal Stability at 60° C (Initial Viscosity 4.98 cps) is 4.26 after 6 weeks.

EXAMPLE 6

Again the procedure of Example 1 is followed except that the ethylene oxide reaction product is replaced by 0.5% of sodium bis(tridecyl)sulfosuccinate. The Daily freeze-thaw cycle (−10° C) particle count is 1 (initial), 3, 2, 3, 3, 5, 8, 7, 8, 10, 14, 18, 12, 14, 15, 14.

The Weekly freeze-thaw cycle (0° C) particle count (3 initial) is 21 after 8 weekly cycles; at −10° C (2 initial) is 12 after 8 weekly cycles; at −20° C (0 initial) is 14 after 8 weekly cycles. The Weekly Thermal Stability (Initial Viscosity 4.98 cps) at 60° C is 3.89 cps after 4 weeks; at 50° C is 3.80 cps after 5 weeks; at 40° C is 4.35 cps after 8 weeks.

EXAMPLE 7

Again following the procedure of Example 1 except that (methacrylamidopropyl)trimethylammonium chloride is added as a comonomer in an amount such that the total parts of monomer is equal but the monomer composition is 90/10 mole ratio of acrylamide to chloride. Substantially identical results are achieved.

EXAMPLE 8

The procedure of Example 4 is again followed except that the acrylic acid content of the monomer composition is 70/30 and the degree of neutralization is 60%. Tests of the result emulsion indicate substantially the same results.

EXAMPLE 9

Methacrylic acid is substituted for acrylic acid in Example 1. Results are substantially equivalent.

EXAMPLES 10 AND 11

Following the procedure of Example 6 except that (10) sodium bis(triundecyl)sulfosuccinate and (11) sodium bis(tripentadecyl)sulfosuccinate are used, substantially identical results are achieved.

I claim:

1. A freeze-thaw stable, self-inverting, non-creaming water-in-oil emulsion containing a dispersion therein of finely-divided polymer particles, said emulsion comprising:
   A. an aqueous phase ranging from about 70% to about 95%, by weight, based on the total weight of A and B, which is comprised of:
      1. a water-soluble acrylamide polymer containing from about 0% to about 35%, by weight of the polymer, of a copolymerizable monomer of an acrylic acid or (methacrylamidopropyl)trimethylammonium chloride, the acrylic acid in said polymer, if any, being from about 50% to about 100% neutralized, and having a concentration from about 27% to about 68%, by weight, based on the total weight of A, and
      2. water in an amount ranging from about 32% to about 73%, by weight, based on the total weight of A,
   B. a liquid hydrocarbon oil in an amount ranging from about 5% to about 30%, by weight, based on the total weight of A and B,
   C. a water-in-oil emulsifying agent disposed between said aqueous phase and said liquid hydrocarbon at a concentration of about 0.1% to about 15.0%, by weight, based on the total weight of A, B and C and
   D. an inverting surfactant mixture comprising sodium bis(2-ethylhexyl) sulfosuccinate and a sodium bis($C_{11}$–$C_{15}$ alkyl) sulfosuccinate or an ethoxylated octyl or nonyl phenol, the amount of said sodium bis(2-ethylhexyl) sulfosuccinate ranging from about 0.25% to about 1.5%, by weight, when said polymer is cationic, and from about 2.8% to about 7.0%, by weight, when said polymer is anionic or non-ionic, the amount of said sodium bis($C_{11}$–$C_{15}$ alkyl) sulfosuccinate ranging from about 0.2% to about 0.6%, by weight, and the amount of said ethoxylated octyl or nonyl phenol ranging from about 1.5% to about 2.5%, by weight, said weight being based on the total weight of A, B, C and D.

2. An emulsion according to claim 1 wherein said polymer comprises about 70% acrylamide and about 30% acrylic acid.

3. An emulsion according to claim 1 wherein said polymer comprises about 75% acrylamide and about 25% (methacrylamidopropyl)trimethylammonium chloride.

4. An emulsion according to claim 1 wherein said polymer comprises about 97% acrylamide and about 3% acrylic acid.

5. An emulsion according to claim 1 wherein said polymer is polyacrylamide.

6. An emulsion according to claim 1 wherein said inverting surfactant mixture comprises sodium bis(2-ethylhexyl)sulfosuccinate and sodium bis(tridecyl)sulfosuccinate.

7. An emulsion according to claim 1 wherein said inverting surfactant mixture comprises sodium bis(2-ethylhexyl) sulfosuccinate and the reaction product of about one mole of nonyl phenol with about 6 moles of ethylene oxide.

8. An emulsion according to claim 1 wherein said inverting surfactant mixture comprises sodium bis(2-ethylhexyl)sulfosuccinate and the reaction product of about one mole of ocyl phenol with about 7.5 moles of ethylene oxide.

9. A method of preparing the freeze-thaw stable emulsion of claim 1 which comprises:
   A. forming a water-in-oil emulsion of
      1. from about 70% to about 95%, by weight, based on the total weight of 1 and 2, of a solution of
         a. a mixture of acrylamide and from about 0% to about 35%, by weight, based on the total weight of the mixture, of a copolymerizable monomer of an acrylic acid or (methacrylamidopropyl)trimethylammonium chloride, the acrylic acid, if any, being from about 50-75% neutralized, having a concentration from about 27% and about 68%, by weight, based on the total weight of a and b, and
         b. water, in an amount ranging from about 32%, to about 73%, by weight, based on the total weight of a and b,
      2. a liquid hydrocarbon oil in an amount ranging from about 5% to about 30%, by weight, based on the total weight of 1 and 2,
      3. a water-in-oil emulsifying agent in a concentration of about 0.1% to about 15.0%, by weight, based on the total weight of 1, 2 and 3, and
      4. a free radical initiator comprising sodium metabisulfite and a hydroperoxide,
   B. polymerizing said monomers under free-radical polymerizing conditions to form a water-in-oil emulsion which contains dispersed therein finely divided particles of a polymer of said acrylamide, and
   C. adding to said oil-in-water emulsion an inverting surfactant mixture comprising sodium bis(2-ethylhexyl)sulfosuccinate and a sodium bis($C_{11}$–$C_{15}$ alkyl)sulfosuccinate or an ethoxylated nonyl or octyl phenol, the amount of said sodium bis(2-ethylhexyl)sulfosuccinate ranging from about 0.25% to about 1.5%, by weight, when said comonomer is cationic, and from about 2.8% to about 7.0%, by weight, when said comonomer is anionic or nonionic or is absent, the amount of said sodium bis($C_{11}$–$C_{15}$ alkyl)sulfosuccinate ranging from about 0.2% to about 0.6%, by weight, and the amount of said ethoxylated nonyl or octyl phenyl ranging from about 1.5% to about 2.5%, by weight, said weights being based on the total weight of said 1, 2, 3 and C.

10. A method according to claim 9 wherein said monomer mixture comprises about 70% acrylamide and about 30% of an acrylic acid.

11. A method according to claim 9 wherein said monomer mixture comprises about 75% acrylamide and about 25% of (methacrylamidopropyl)trimethylammonium chloride.

12. A method according to claim 9 wherein said monomer mixture comprises about 97% acrylamide and about 3% acrylic acid.

13. A method according to claim 9 wherein said monomer comprises acrylamide.

14. A method according to claim 9 wherein said inverting surfactant mixture comprises sodium bis(2-ethylhexyl)sulfosuccinate and sodium bis(tridecyl)sulfosuccinate.

15. A method according to claim 9 wherein said inverting surfactant mixture comprises sodium bis(2-ethylhexyl)sulfosuccinate and the reaction product of about one mole of nonyl phenol and about 6 moles of ethylene oxide.

16. A method according to claim 9 wherein said inverting surfactant mixture comrpises sodium bis(2-ethylhexyl)sulfosuccinate and the reaction product of about one mole of octyl phenol and about 7.5 moles of ethylene oxide.

* * * * *